(12) United States Patent
Pearce et al.

(10) Patent No.: US 7,389,180 B2
(45) Date of Patent: Jun. 17, 2008

(54) ELECTRONIC TRACKING AND RANGING SYSTEM

(76) Inventors: Kent Pearce, 6375 San Juan Canyon Rd., San Juan Bautista, CA (US) 95045; Teryl Pratt, 180 Foothill Ct., Morgan Hill, CA (US) 95037

( * ) Notice: Subject to any disclaimer, the term of this patent is extended or adjusted under 35 U.S.C. 154(b) by 425 days.

(21) Appl. No.: 10/773,700

(22) Filed: Feb. 6, 2004

(65) Prior Publication Data
US 2005/0177306 A1 Aug. 11, 2005

(51) Int. Cl.
*G01C 21/00* (2006.01)
(52) U.S. Cl. ............. 701/207; 375/140; 375/371
(58) Field of Classification Search ............. 701/207; 375/140, 146, 147, 226, 371, 376; 340/573.1, 340/573.4, 539.13, 539.15, 825.49
See application file for complete search history.

(56) References Cited

U.S. PATENT DOCUMENTS

| | | | |
|---|---|---|---|
| 5,003,552 A * | 3/1991 | Mower | 375/140 |
| 5,629,678 A | 5/1997 | Gargano et al. | |
| 6,075,442 A | 6/2000 | Welch | |
| 6,243,039 B1 | 6/2001 | Elliot | |
| 6,353,406 B1 * | 3/2002 | Lanzl et al. | 342/118 |
| 6,556,942 B1 * | 4/2003 | Smith | 702/150 |
| 6,724,811 B2 * | 4/2004 | Kohli et al. | 375/150 |
| 6,812,824 B1 * | 11/2004 | Goldinger et al. | 340/10.1 |
| 6,867,693 B1 * | 3/2005 | Radin | 340/539.13 |
| 7,009,561 B2 * | 3/2006 | Menache et al. | 342/463 |
| 2001/0045894 A1 | 11/2001 | Slavin et al. | |
| 2002/0080036 A1 | 6/2002 | Rabanne et al. | |
| 2002/0101351 A1 | 8/2002 | Lochner | |
| 2003/0011478 A1 | 1/2003 | Rabanne et al. | |
| 2006/0181393 A1 * | 8/2006 | Raphaeli | 340/10.1 |

OTHER PUBLICATIONS

Texas Instruments RFid and Safe Tzone Help Family and Friends Play it Safe at Amusement Parks; Nov. 26, 2002; 4 pages; Dallas, TX.
Bruce Felps; College Student Article; May 3, 1999, 2 pages.
D. Gerez, E. Guerrero, R. Hacking, M. Lund, D. Park, H. Park, E. Smith, and T. Welton; Theme Park Visitors & Cashless Purchasing; 2 pages.

* cited by examiner

*Primary Examiner*—Richard M. Camby
(74) *Attorney, Agent, or Firm*—Gross & Associates

(57) ABSTRACT

An electronic tracked and ranging system is disclosed. Electronic tracking and ranging system applies interferometer principles to determine ranging distance from a monitor unit 10 to a tracked unit 12. In particular, the system transmits a monitor direct sequence spread spectrum (MDSSS) 52 signal from a monitor unit 10 to a tracked unit 12. Afterwards, tracked unit 12 transmits a tracked direct sequence spread spectrum (TDSSS) 56 signal. Finally, monitor unit 10 receives TDSSS 56, performs a comparison to a reference MDSSS signal 52 locks between MDSSS signal 52 and TDSSS signal 56 and outputs distance between monitor unit 10 and tracked unit 12 using several phase comparisons. Multiple frequencies within MDSSS signal 52 are phase detected so as to increase accuracy of monitor unit 10 ranging distance to tracked unit 12.

17 Claims, 9 Drawing Sheets

ELECTRONIC TRACKING AND RANGING SYSTEM

TECHNICAL FIELD

This invention relates to an electronic tracking and ranging system. More specifically, an electronic tracking and ranging system that utilizes phase differences between a monitor signal and a signal received from a tracked unit, where the signal from the tracked unit is phase aligned with the received signal from the monitor unit (at the tracked unit), and where multiple frequency components of both monitor unit and tracked unit signals are phase detected to determine the ranging distance of an object including a tracked unit from a monitor unit.

BACKGROUND ART

There is a need for an improved electronic tracking and ranging system to account for RF signal variations due to RF signal attenuation from energy waves, such as electromagnetic energy, are being reflected off and being dissipated in surrounding areas. Present electronic tracking and ranging systems require a special calibration procedure or special settings so that a user can determine range or track an object within a given area or a given location. In addition, other problems with present electronic tracking and ranging systems for objects include the use of very fine timing intervals for accurate measurements, i.e., within a couple of nanoseconds, and inherent delays in a transponder response time and transponder variations with temperature changes may cause larger ranging variations than the time interval being measured. More recent systems apply interferometer principles to determine range with a single wavelength. The signal sources of both monitor and tracked units are stabilized either with highly stable reference oscillators or by reference to a common external source, such as the signal from an AM broadcast station or timing signals from global positioning system (GPS) satellites. Present use of direct sequence spread spectrum (DSSS) modulation is for increased power or better separation from other signals and the phase measurements are of the underlying carrier frequency to which the DSSS modulation is applied, thus the requirement for very precise internal frequency references or an external source of phase or timing reference. To achieve the desired range accuracy, such as within one or two feet, the wavelength is necessarily much shorter than the range, thus requiring some means to count the number of wavelengths adding to the portion of a final wavelength that is determined by phase relation. One such practical invention bypasses counting wavelengths by recording successive spatial distances, thus only relatively small range increments of change are required to be measured between measurement intervals. Thus, there is a need for an improved electronic tracking and ranging system that provides an improved solution to the above problems such as increasing accuracy of locating an object including a tracked unit, even when the transmitted signal is attenuated as well as provide other advantages over present tracking and ranging systems, including the ability to determine range without knowledge of prior positions and without need of external references, such as phase references from broadcast stations or timing references from global positioning system (GPS) or other sources. Pseudo random noise (PN) sequences used to generate direct sequence spread spectrum signals (DSSS) have the property that all shifted positions of the sequence will fail to correlate with the original sequence. This correlation is similar to the action of the random cuts on a key which only match the tumblers of a lock when positioned fully into the lock. The repetition rate of the PN sequence establishes a long period, which may be thought of as a long wavelength, and is comprised within the DSSS signal. Use of this long wavelength, comprised within the DSSS signal, together with any subsequences of PN code, the chipping rate inherent in the modulation, any further modulation of the DSSS signal, and the carrier to provide multiple wavelengths solves the problem of attaining the desired precision while measuring ranges at multiples of the carrier wavelength. The delays in present transponders is avoided in the present invention by correlating the retransmitted PN sequence with the received PN sequence at the tracked unit, thus the PN sequence received at the monitor unit is received as if it were reflected back from the tracked unit without delay.

DISCLOSURE OF THE INVENTION

Disclosed is an electronic ranging and tracking system for objects that applies interferometer principles to determine distance between a monitor unit to a tracked unit. In particular, the monitor unit transmits a monitor direct sequence spread spectrum (MDSSS) signal to a tracked unit. Afterwards, tracked unit receives MDSSS signal, aligns a copy of the monitor pseudo-random noise (PN) sequence by periodically shifting its phase until alignment occurs. Then tracked unit transmits back to monitor unit a tracked direct sequence spread spectrum (TDSSS) signal, wherein the monitor pseudo-random noise (PN) sequence of MDSSS and the tracked pseudo-random noise (PN) sequence of TDSSS are phase aligned. The tracked unit has no need of highly stable reference oscillators or any external frequency reference, since the process of receiving the MDSSS signal provides the phase reference of the received monitor pseudo-random noise (PN) sequence for alignment with the generated tracked pseudo-random noise (PN) sequence, thus the tracked TDSSS signal is in phase with the received MDSSS signal at the tracked unit location. Finally, the monitor unit receives TDSSS signal, performs a comparison to MDSSS signal, locks signals between MDSSS and TDSSS, and outputs at least one phase difference between MDSSS signal and TDSSS signal. During the locking process, TDSSS signal comprising three frequencies, i.e., a carrier frequency, a chipping frequency of pseudo-random noise (PN) sequence, and a repetition frequency of pseudo-random noise (PN) sequence, which are utilized within the monitor unit to calculate ranging distance between the tracked unit and the monitor unit.

MODES FOR CARRYING OUT THE INVENTION

Figure 1:
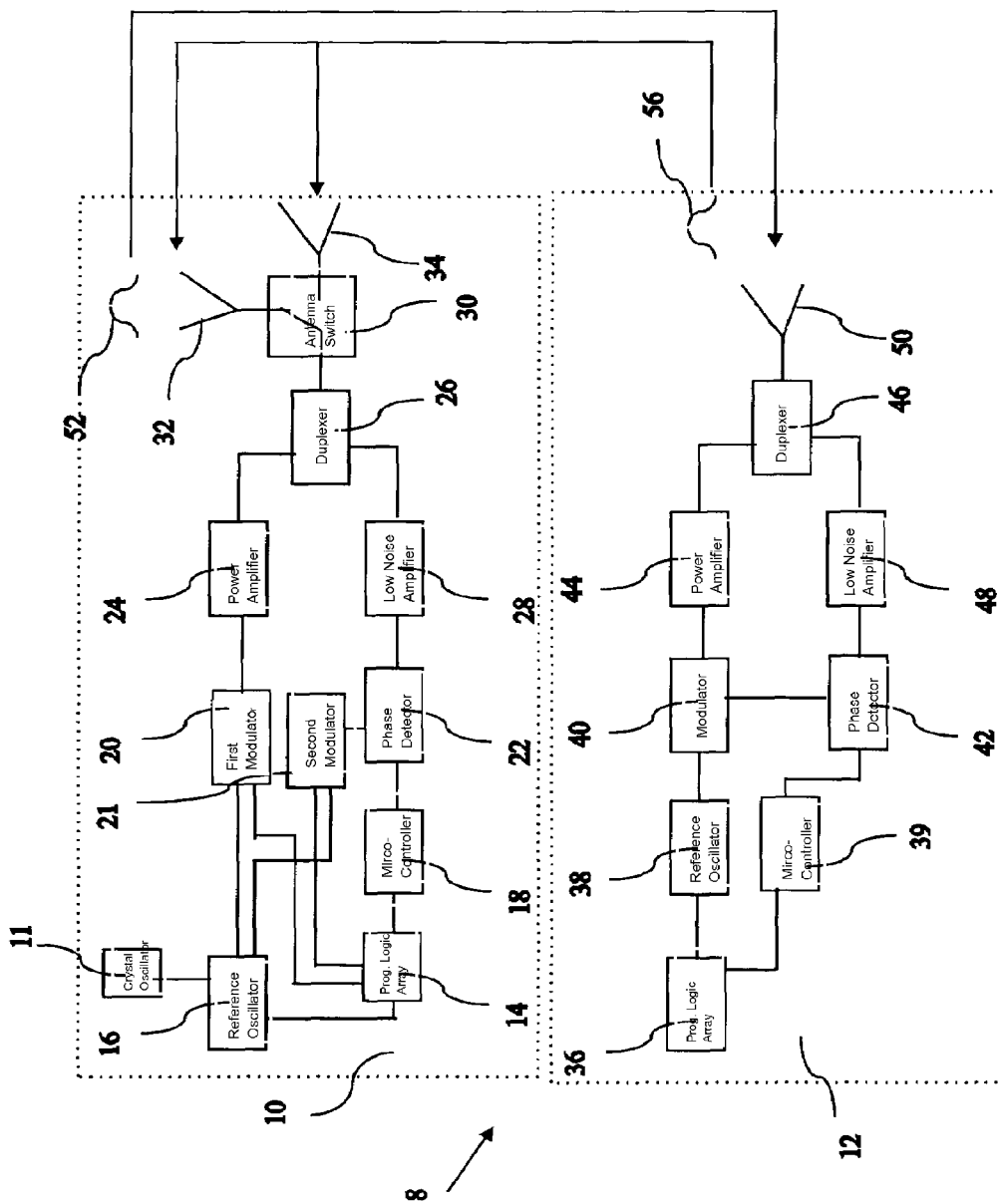
FIG. 1 is the block diagram for an interferometer electronic tracking system of the present invention.

FIG. 1 is the block diagram for an interferometer electronic tracking system 8. Interferometer electronic tracking system 8 comprises a monitor unit 10 and a tracked unit 12. Monitor unit 10 comprises a monitor programmable logic array 14, a monitor reference oscillator 16, a monitor micro-controller 18, a first monitor modulator 20, a second monitor modulator 21, a monitor power amplifier (PA) 24, a monitor duplexer 26, a monitor low noise amplifier (LNA) 28, an antenna switch 30, a first monitor antenna 32, and a second monitor antenna 34. Tracked unit 12 comprises a tracked programmable logic array 36, a tracked reference oscillator 38, a tracked micro-controller 39, a tracked modulator 40, a second tracked modulator 42, a tracked power amplifier (PA) 44, a tracked duplexer 46, a tracked low noise amplifier (LNA) 48, and a tracked antenna 50. Monitor unit 10 transmits a monitor direct sequence spread spectrum (MDSSS) signal 52 to the tracked unit 12 including a monitor reference frequency 70 (see FIG. 6) and a monitor pseudo-random noise (PN) sequence 65 (see FIG. 5). MDSSS signal 52 waveform is a waveform like that used by a Wireless Local Area Network (WLAN) utilizing direct sequence spread spectrum (DSSS) technology. Tracked unit 12 receives MDSSS signal 52 and transmits to monitor unit 10 a tracked direct sequence spread spectrum (TDSSS) signal 56 including a tracked reference frequency 72 (see FIG. 6) and a tracked pseudo-random noise (PN) sequence 61 (see FIG. 5). TDSSS 56 waveform is a waveform like that used by a Wireless Local Area Network (WLAN) utilizing direct sequence spread spectrum (DSSS) technology. Following, monitor unit 10 receives TDSSS signal 56 and calculates ranging distance between monitor unit 10 and tracked unit 12 using multiple frequency phase comparisons between MDSSS signal 52 and TDSSS signal 56.

Figure 2:
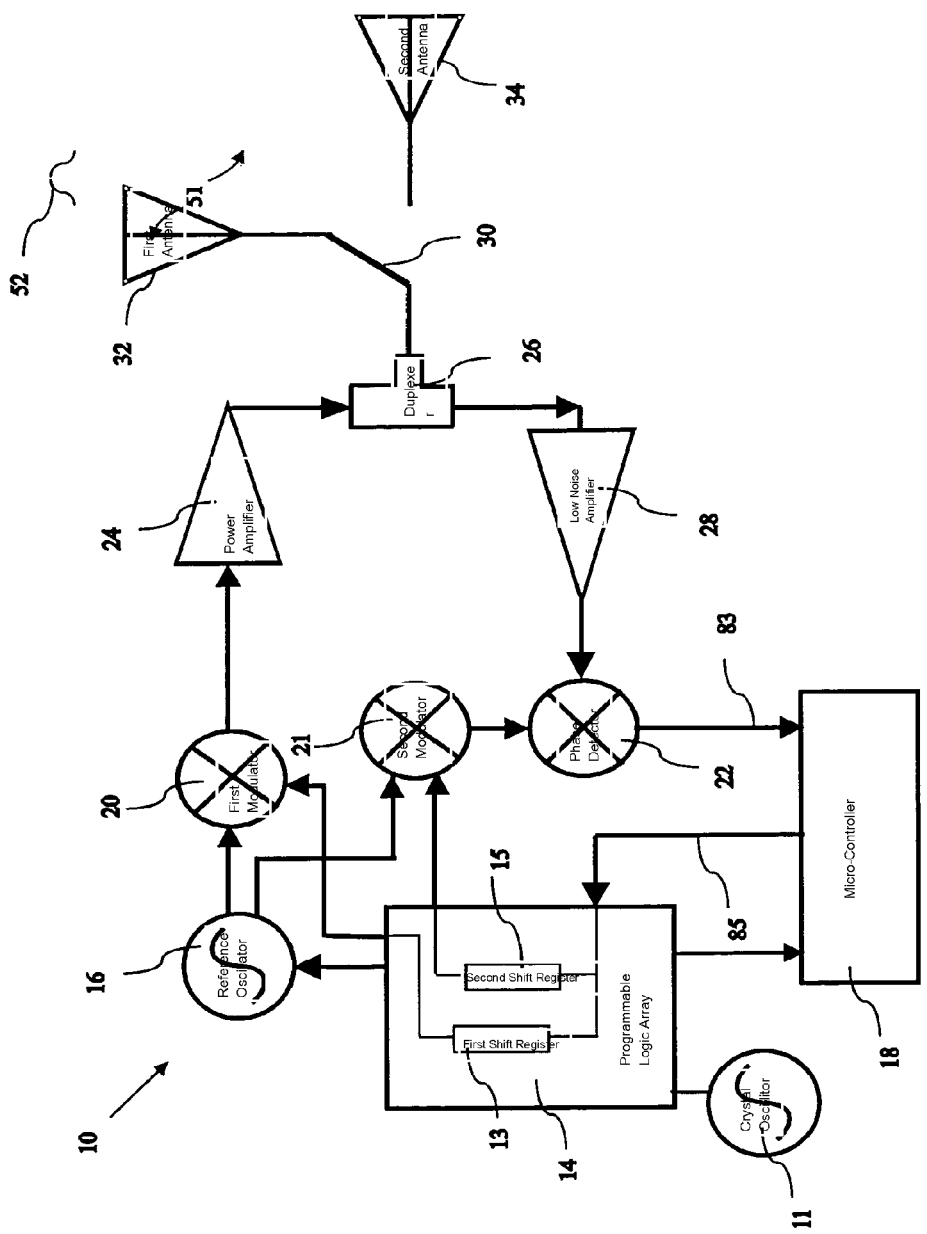
FIG. 2 is a schematic of a monitor unit for the present invention.

FIG. 2 is a schematic of the monitor unit 10 for the interferometer electronic tracking system 8. The monitor unit 10 generates the monitor reference frequency 70 from the monitor reference oscillator 16 such as a voltage-controlled oscillator or the like. The monitor programmable logic array 14 has a phased-lock loop which locks the monitor reference oscillator 16 to a multiple of a clock frequency of the monitor programmable logic array 14. The clock frequency is derived from the crystal oscillator 11. In this embodiment, the monitor reference frequency 70 is a carrier frequency such as a Radio Frequency (RF). Furthermore in this embodiment, carrier frequency 915 MHz. The monitor reference oscillator 16 output electrically connects to an input port of the first monitor modulator 20. The first monitor modulator 20 functions to modulate the carrier frequency 70 with a monitor direct sequence spread spectrum (MDSSS) signal 52 that will be sent through the monitor power amplifier 24. The MDSSS signal 52 has three components, a monitor first frequency component 57, a monitor second frequency component and a monitor third frequency component also the carrier frequency 70. In the present embodiment, the monitor first frequency component is a repetition rate 57 and the monitor second frequency component is a chipping frequency or chipping rate.

In this embodiment, monitor PN sequence 65 is applied at the rate termed the chipping frequency. Monitor PN sequence 65 modulates carrier frequency to create signal spreading of carrier frequency. In particular, chipping frequency is the rate at which monitor PN sequence spreads the bandwidth of carrier frequency. Also, chipping frequency determines desired monitor frequency bandwidth, where monitor frequency bandwidth is twice the chipping rate. In this embodiment, a 915 MHz carrier frequency with a chipping frequency of 12 MHz generates a monitor frequency bandwidth extending over a frequency range of 903 MHz to 927 MHz. Furthermore, monitor PN sequence 65 has a finite length, which finite length is divided into chipping frequency to yield a repetition rate 57 wherein monitor PN sequence 65 repeats. The length of monitor PN sequence 65 determines this repetition rate 57 because repetition rate 57 is the chipping rate divided by length of monitor PN sequence 65. In this embodiment, a monitor PN sequence 65 with a length of 40 characters results in a repetition rate 57 of 250 kHz. Alternatively, a monitor PN sequence 65 with a length of 133 characters results in a repetition rate of 75.2 kHz.

Within monitor programmable logic array 14, monitor PN sequence is created by a spreading sequence originating from a set of "source" registers (not shown in Figure) within monitor programmable logic array 14. Monitor PN sequence 65 loads into a first shift register 13 and into a second shift register 15 within monitor programmable logic array 14, whereby monitor PN sequence 65 is shifted at the chipping rate. In particular, monitor programmable logic array 14 including first shift register 13 with a digital tap line (not shown in Figure) controlled by monitor micro-controller 18 to spread monitor PN sequence at chipping frequency, outputting a single bit value at the chipping rate of the shifted monitor PN sequence to first monitor modulator 20. Additionally, monitor programmable logic array 14 includes second shift register 15 with a digital tap line (not shown in Figure) controlled by monitor micro-controller 18 to supply monitor PN sequence 65 at chipping frequency, outputting a single bit value at the chipping rate of shifted version on monitor PN sequence 65 to second monitor modulator 21. Each time first shift register 13 or second shift register 15 has shifted monitor PN sequence 65 a number of times equal to the length of monitor PN sequence 65, first shift register 13 or second shift register 15 are re-loaded from the respective "source" registers (not shown in Figure).

Following, monitor direct sequence spread spectrum signal (MDSSS) 52, i.e., monitor signal, is electrically connected to a monitor power amplifier 24 to boost monitor signal strength. Monitor power amplifier 24 sends monitor signal 52 through monitor duplexer 26, such as Mini-circuits RCM-12-4-75 or a functional equivalent, and antenna switch 30, such as Agilent N9397C, directing monitor signal 52 to first monitor antenna 32, such as a miniature board mounted antenna, for transmission to tracked unit 12. Preferably, monitor reference oscillator 16, monitor modulator 20, and monitor power amplifier 24 functional blocks would be contained in one electronic circuit such as a Philips SA900 or a functional equivalent.

Figure 3:
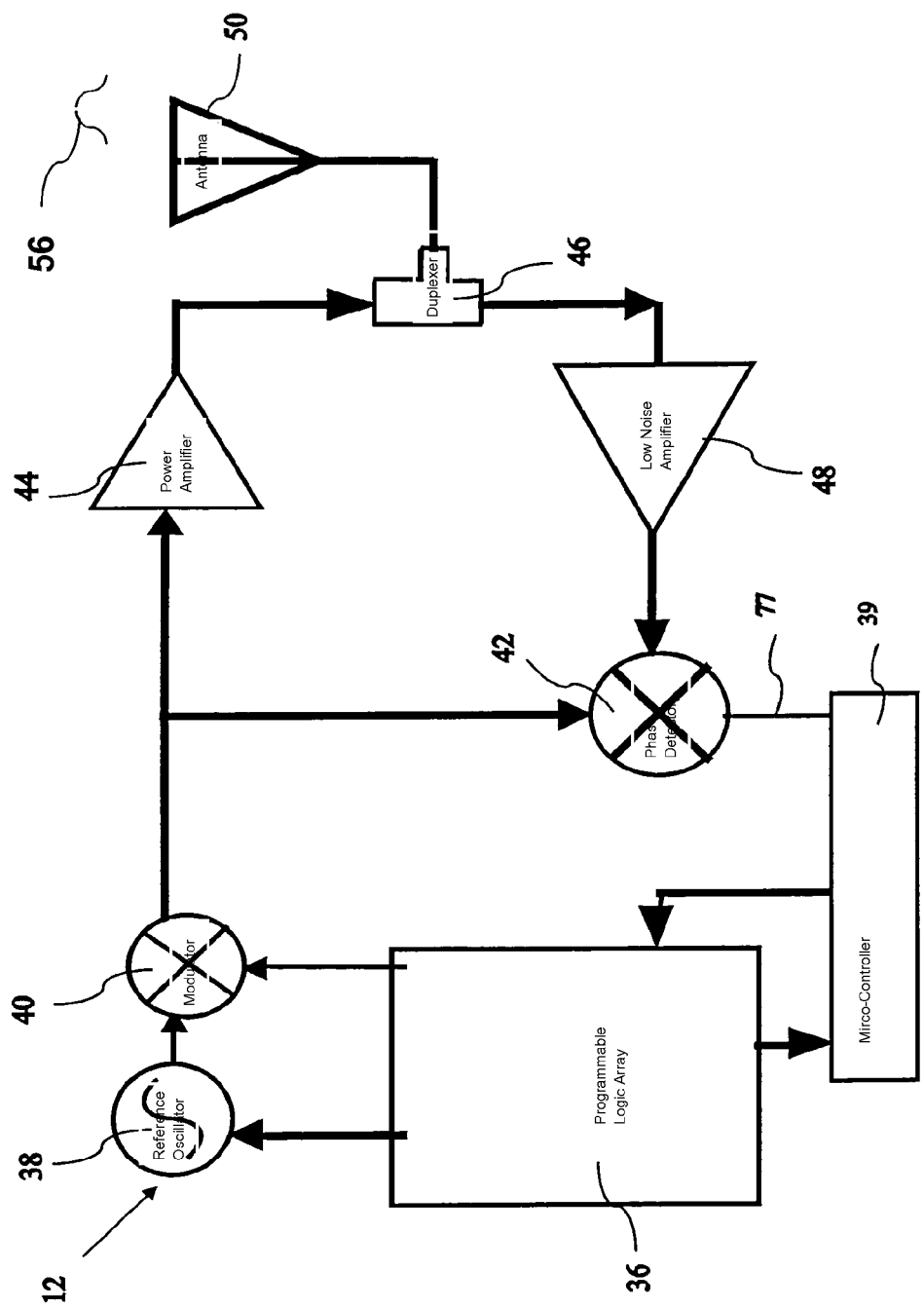
FIG. 3 is a schematic of a tracked unit for the present invention.

FIG. 3 is a schematic of a tracked unit. Tracked unit 12 is a transponder. A tracked antenna 50 on tracked unit 12 receives monitor signal 52. Preferably, tracked antenna 50 is a miniature board mounted antenna. Tracked duplexer 46, such as Mini-circuits RCM 12-4-75 or alternatively a functional equivalent, electrically connects MDSSS 52 to a tracked low noise amplifier (LNA) 48, such as Agilent ABA-51563 or a functional equivalent, for signal amplification. Afterwards, monitor PN sequence transmitted within monitor signal 52 is mixed with tracked PN reference sequence 61 (a copy of the monitor PN sequence 65) within a tracked modulator 42, which is a mixer such as Miniciruits ADE-2 or a functional equivalent. Tracked modulator 42 generates a tracked PN error sequence 77, which tracked PN error sequence 77 is mixed with reference oscillator frequency 72 in tracked mixer 41, such as Minicircuits ADE-2 or a functional equivalent, to produce a low frequency or possibly DC signal which is transmitted to a tracked microcontroller 39, such as Microchip PIC16F873, Altera NEOS inside EPIC3, or a functional equivalent circuit, which controls a tracked programmable logic array 36, such as Altera EPIC3 or a functionally equivalent circuit.

Tracked programmable logic array 36 shifts a tracked PN sequence 61 (which is a copy of monitor PN sequence 65) and outputs a shifted version of tracked PN sequence 61 to a tracked modulator 42. Tracked modulator 42 correlates shifted tracked PN sequence 61, wherein tracked PN error sequence 77 is again regenerated. Afterwards, the above steps are repeated with additional shifts of tracked PN sequence 61 until shifted monitor PN sequence 61 locks with monitor PN sequence 65 contained in MDSSS. As such, the above steps of regenerating monitor PN sequence within tracked unit 12 to adjust for phase errors generated within tracked unit 12, avoids phase inaccuracies introduced by conventional transponders that don't regenerate monitor PN sequence 65. After locking between tracked PN sequence 61 and monitor PN sequence 65 occurs, tracked modulator 40 outputs a tracked direct sequence spread spectrum signal (TDSSS), i.e., tracked signal 56, outputting tracked signal 56 through tracked amplifier 44. Tracked amplifier 44 electrically connects to tracked antenna 50 through tracked duplexer 46 for transmitting TDSSS signal 56 to monitor unit 10.

TDSSS signal 56 embodies three frequencies, a first frequency component or the tracked reference frequency 72, a second frequency component 61 and a third frequency component 55. In the present embodiment, the first frequency component is a carrier frequency 72 (FIG. 6), the second frequency component is a chipping frequency 61 (FIG. 5), and the third frequency component is a repetition rate 55 (FIG. 4) (i.e., the rate of repetition of monitor PN sequence). These three frequencies have an associated wavelength, for one complete cycle. Using monitor phase detector 22 measurements, a user compares phase of tracked signal 56 to monitor signal 52 for various frequency components. These phase differences between tracked signal 56 and monitor signal 52 is used to determine ranging distance between monitor unit 10 and tracking unit 12. The ranging distance results from that portion of the wavelength that corresponds to a proportion of a phase difference as compared with a full cycle, i.e., 360 degrees. Coarse distance calculation is done with the largest wavelength frequency. Afterwards, coarse distance calculation is used in conjunction with a smaller wavelength frequency component to determine with increased accuracy the ranging distance for the portion of the distance that is in excess of an integer number of wavelengths. Prior art would have counted within a digital counter the number of frequency intervals that are repeated while this present invention would compare phase shift between different frequencies of the TDSSS signal 56 and the MDSSS signal 52, and use these phase differences of each frequency component for measuring ranging distance between tracked unit 12 and monitor unit 10. However, heating is a step completed within a much shorter time than the drying step and the subsequent germination induction step.

Referring to FIG. 2, a first monitor antenna 32 and a second monitor antenna 34 receives tracked signal 56. In this embodiment, first monitor antenna 32 and second monitor antenna 34 are cross-polarized. Antenna switch 30 selects first monitor antenna 32. Tracked signal 56 received by first monitor antenna 32 electrically connects to monitor duplexer 26, which directs tracked signal 56 to monitor low noise amplifier 28 for boosting signal level. Afterwards, tracked signal 56 is frequency mixed with monitor signal 52 to generate a monitor PN error signal 83. Monitor PN error signal 83 is electrically connected to monitor micro-controller 18 through down-converting mixer 22. Monitor micro-controller 18 generates a monitor PN shift control 85 which is electrically connected to monitor programmable logic array 14. Monitor programmable logic array 14 shifts monitor PN sequence 65 and applies a shifted version of monitor PN sequence 65 (FIG. 5) to second modulator 21 that connects to monitor mixer 22. In this embodiment, monitor PN sequence 65 has a repetition rate 57, i.e., monitor first frequency component of 250 kHz.

Figure 4:
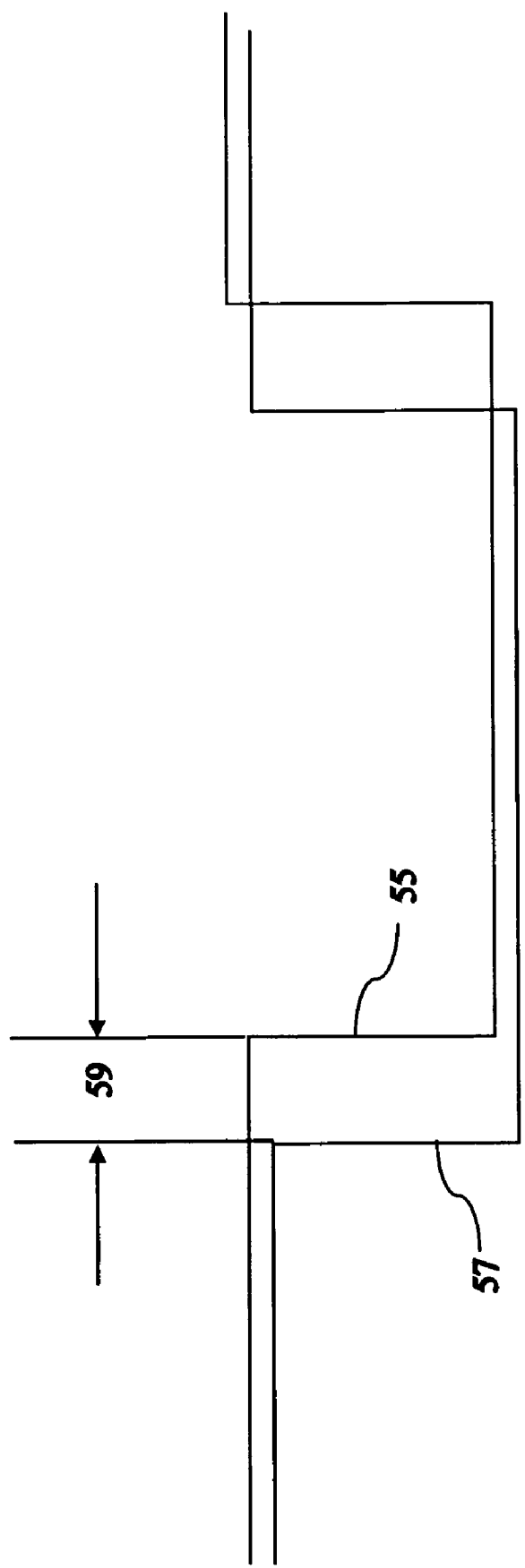
FIG. 4 illustrates a first phase comparison of a monitor unit of the present invention.

FIG. 4 illustrates first phase comparison technique of monitor unit 10 interferometer of present invention. In particular, detection of TDSSS 56 involves shifting monitor repetition rate 57 until it locks with tracked first frequency component 55 of TDSSS signal 56. As explained above monitor programmable logic array 14 implements a first shift register 13 (shown in FIG. 2) and a second shift register 15 (shown in FIG. 2) and a digitally controlled tap (not shown in Figure) along each shift register to calculate a first phase difference 59 between tracked first frequency component 55 relative to monitor repetition rate 57, i.e., monitor first frequency component 55 locks with monitor repetition rate 57. In this embodiment, within monitor programmable logic array 14, a phase comparison is made between a tracked first frequency component 55, i.e., a 250 kHz and a monitor repetition rate 57 of 250 kHz using a first shift register 13 and second shift register 15, as shown in FIG. 2, to calculate first phase difference 59.

First phase difference 59 determines a coarse measure of ranging distance between tracked unit 12 and monitor unit 10. In this embodiment, a first frequency comprising a 250 kHz reference frequency has roughly a wavelength in free space of 4,000 feet. As such, first phase difference 59 is appropriate for creating a ranging distance error between monitor unit 10 and tracked unit 12 of less than 4,000 feet. In practice, monitor mixer 22 generates a PN phase error, typically around 5 degrees, which gives a first phase difference measurement ranging distance error of over 55 feet. Thus we still need more accuracy of ranging distance between tracked unit 12 and monitor unit 10.

Figure 5:
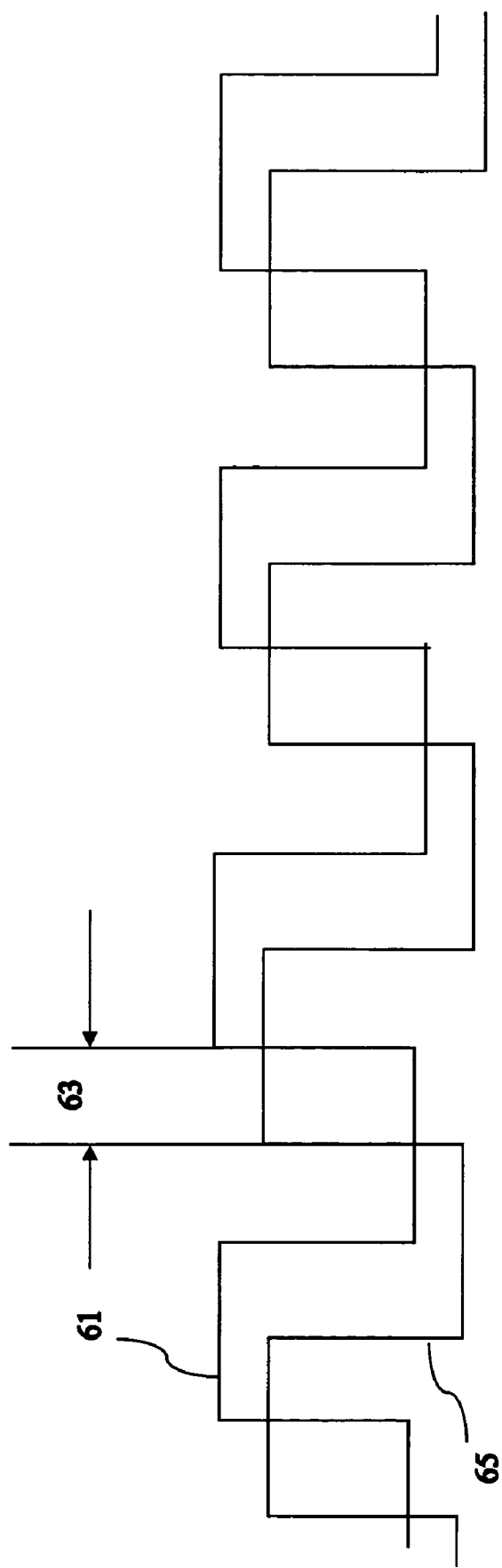
FIG. 5 illustrates a second phase comparison of a monitor unit of the present invention.

FIG. 5 illustrates a second phase comparison of a monitor unit 10 of the present invention. As such, to achieve more accuracy, we need to use a second tracked frequency 61 of TDSSS signal 56 having a medium wavelength. As such, in monitor programmable logic array 14, a second phase comparison is made between a monitor PN sequence 65 (a second monitor frequency component) having a chipping frequency of 12 MHz is compared to TDSSS 56 including a second tracked frequency component 61, which is in this embodiment a 12 MHz signal, to generate a second phase difference 63. Second phase difference 63 is used in conjunction with first phase difference 59 to increase accuracy of determining distance between tracked unit 12 and monitor unit 10. For example, second tracked frequency component 61, which second tracked frequency component 61 has a wavelength of about 69 feet, which determines the number of cycles of 69 feet involved in determining ranging distance of tracked unit 12. Prior art would have counted pulses by determining the number of constructive and destructive phase differences between a reference signal and received signal while the present invention uses more than one phase detection. More specifically, this invention uses more than one phase detection to measure with increasing accuracy, i.e., with increasingly more accurate discrete steps, to generate ranging distance between tracked unit 12 and monitor unit 10.

Figure 6:
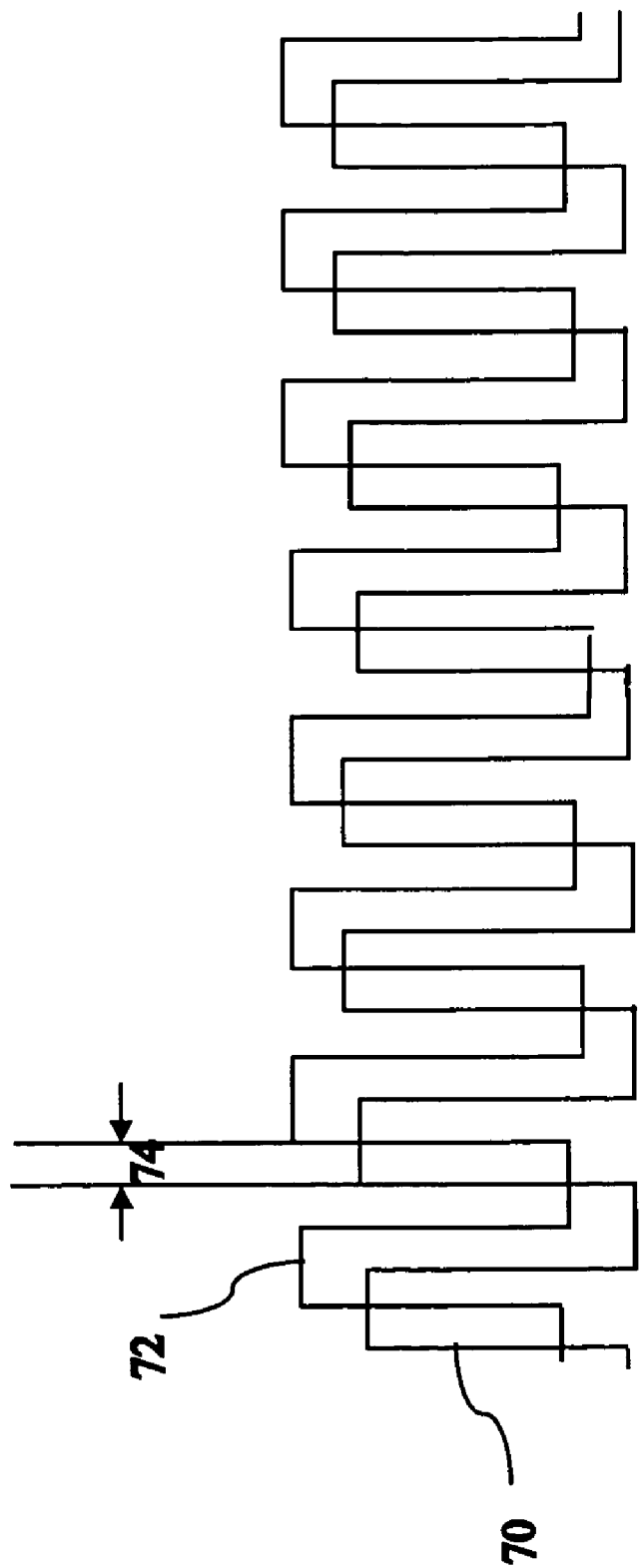
FIG. 6 illustrates a third phase comparison of a monitor unit of the present invention.

FIG. 6 illustrates a third phase comparison of a monitor unit 10 of the present invention. To achieve even more accuracy, this step involves using a third tracked frequency component 72, i.e., 900 MHz band, of the TDSSS signal 56, where monitor programmable logic array 14 performs a third phase comparison between monitor reference frequency 70, i.e., monitor third frequency component, which in this embodiment is carrier frequency, and a tracked third frequency component 72, outputting a third phase difference 74, wherein carrier frequency has a wavelength on the order of 1 foot. This third phase comparison provides very fine step resolution in conjunction with coarse phase error 59 to increase calculation accuracy of tracked unit ranging distance from monitor unit.

Referring to FIG. 2, a measurement of a received signal strength indication (RSSI) from first monitor antenna 32 is made based on amplitude difference between monitor signal 52 and TDSSS signal 56. Following, antenna switch 30 connects second monitor antenna 34, measures shift level, and calculates amplitude difference between monitor signal 52 and TDSSS signal 56. A difference is calculated between first monitor antenna 32 and second monitor antenna 34 received power levels to determine if tracked unit 12 getting closer to monitor unit 10. From this difference in first monitor antenna 32 measured power and second monitor antenna 34 measured power, a relative angle of tracked unit 12 is determined in relation to monitor unit 10. As such, the ratio of power from first monitor antenna 32 to second monitor antenna 34, minus first monitor antenna loss and second monitor antenna loss, equates to the cotangent of an angle 51 relative to axis of first monitor antenna 32.

Figure 7:
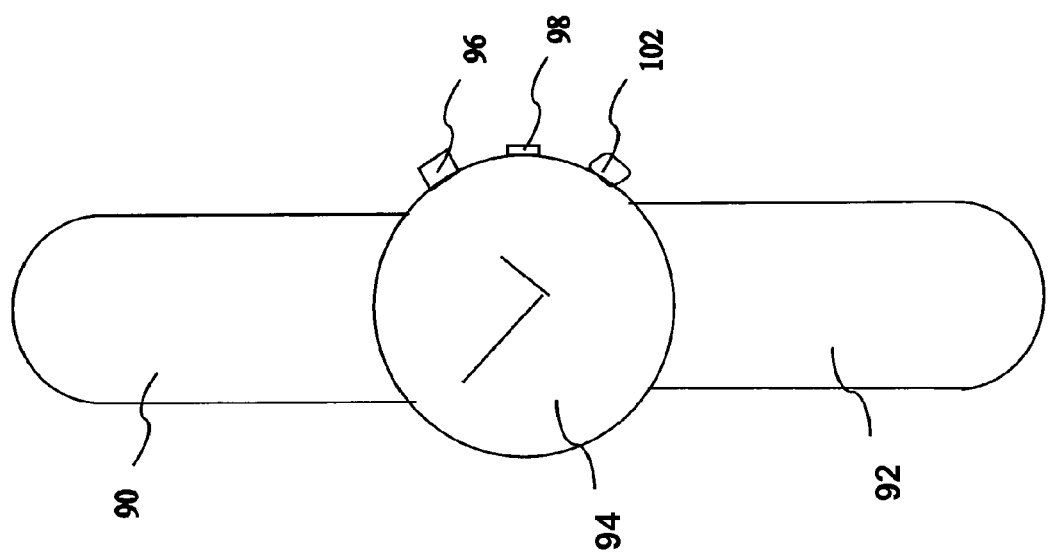
FIG. 7 illustrates a front view of a housing for a tracked unit for the present invention.

FIG. 7 illustrates a front view of a housing for a tracked unit for the present invention. A tracked unit 12 (not shown) is disposed on an integrated circuit that is placed within tracked unit housing 94 where first strap 90 and second strap 92 are attached to a person to be tracked, such as a child. Further, first button 96 activates or deactivates the tracked unit (not shown). In this embodiment, the tracked unit housing 94 includes a working watch where second button 98 sets the watch time and third button 102.

Figure 8:
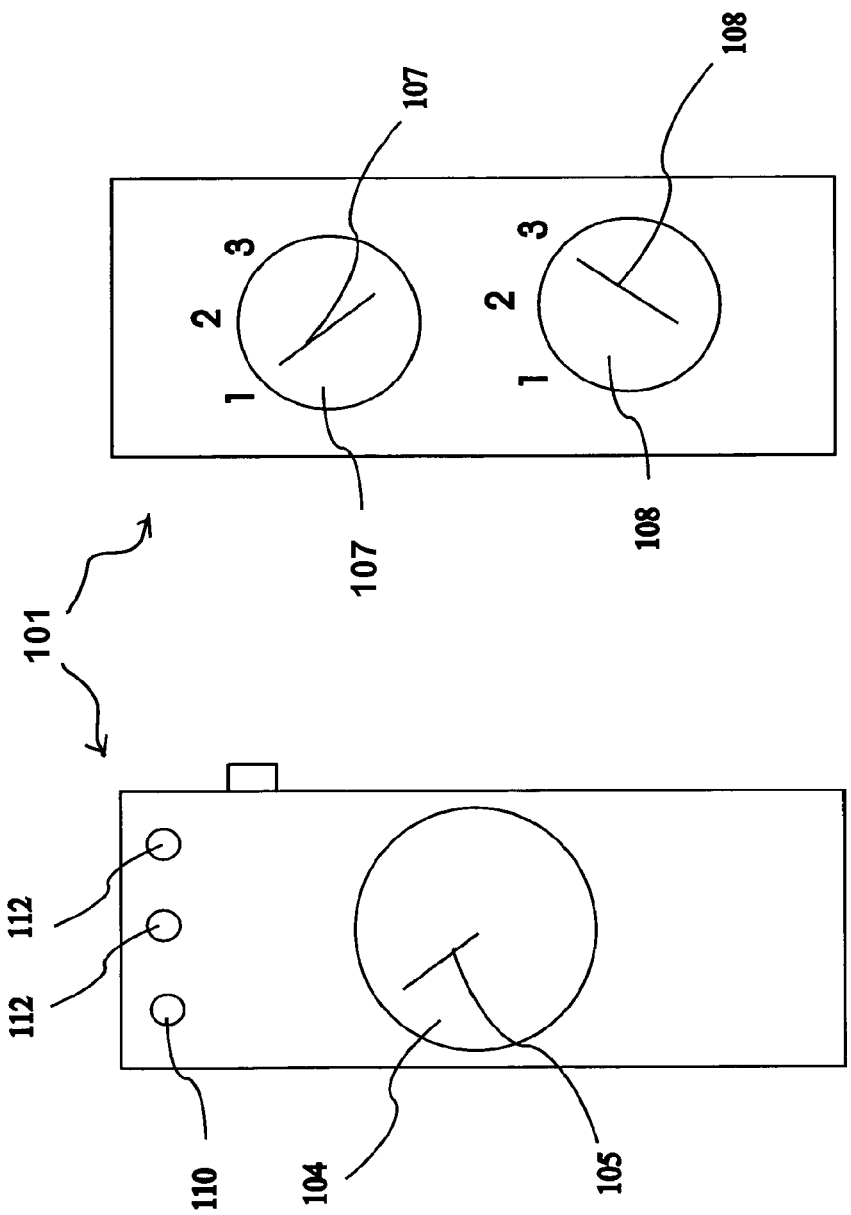
FIG. 8 illustrates a front view and a back view of a housing for a monitor unit for the present invention.

FIG. 8 illustrates a front view and a back view of a housing for a monitor unit for the present invention. A monitor unit 10 (not shown in Figure) is disposed on an integrated circuit (not shown in Figure) placed within monitor unit housing 101, where monitor micro-controller 18 is electrically connected to a monitor compass 104, including three rings dividing the compass into four zones, such as a Liquid Crystal Display (LCD), which monitor compass hand 105 displays location of a tracked unit 12 (not shown in Figure). A user may adjust a first range adjustment dial 106 and a second range adjustment dial 108, allowing a user to select a zone, whereby monitor unit 10 tracks a tracked unit 12 (not shown in Figure).

Figure 9:
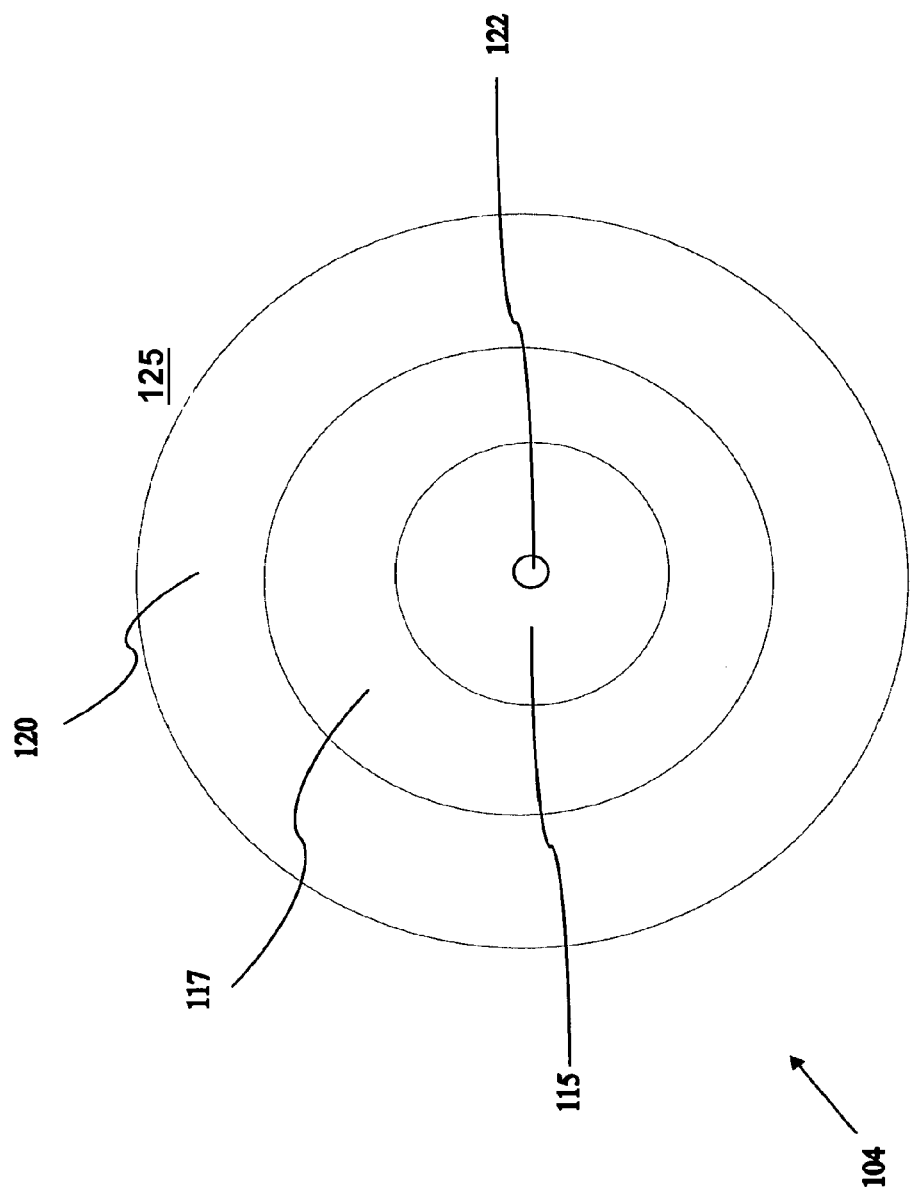
FIG. 9 displays operating field of activity of the system.

FIG. 9 displays operating field of activity of the system of which the said monitor compass 104 represents. In this embodiment, there are four zones of coverage. Each zone shows a user a relative distance between a monitor unit and a tracked unit. A first zone 115, i.e., safe zone, means a tracked unit 10 is within close range of a monitor unit 10. In this Figure, object 122 including a tracked unit 12 (not shown) is within safe zone 115 and first light 110 (shown in FIG. 8) is a displaying that object 122 is within safe zone 115. In the alternative, if an object including a tracked unit (not shown in Figure) was within a second zone 117, which is a first ring of coverage away from safe zone 115, a second light 112 (shown in FIG. 8) would be lit. In yet another alternative, if an object including a tracked unit 12 (not shown in Figure) is within a third zone 120, a third light 118 (shown in FIG. 8) would be lit. In yet a further alternative, fourth zone 125 is the area outside of third zone of coverage 120. As such, each ring of coverage, i.e., second zone 117 and third zone 120 are concentric rings of coverage to alert a user of a relative change in ranging distance of said monitor unit 10 (FIG. 1) to said tracked unit 12 (FIG. 1).

Information herein shown and described in detail is fully capable of attaining the above-described object of the invention and the present embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more", All structural and functional equivalents to the elements of the above-described embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, one skilled in the art should recognize that various changes and modifications in form and material details may be made without departing from the spirit and scope of the inventiveness as set forth in the appended claims. No claim herein is to be construed under the provisions of 35 U.S.C. § 112, sixth paragraph, unless the element is expressly recited using the phrase "means for".

INDUSTRIAL APPLICABILITY

This invention applies industrially to an electronic tracking and ranging system. More specifically, the present invention applies industrially to an object tracking and ranging system that utilizes phase differences between monitor reference signal and monitor received signal from multiple frequency bands to increase accuracy of locating objects. The present invention reduces positioning inaccuracy due to surrounding area.

We claim:
1. An electronic system for locating an object comprising:
a monitor unit having a micro-controller, wherein the monitor unit transmits a monitor direct sequence spread spectrum (MDSSS) signal having a pseudo-random noise sequence, a monitor first frequency component and a monitor second frequency component;
a tracked unit placed on the object and receiving the MDSSS signal from the monitor unit and transmits a tracked direct sequence spread spectrum (TDSSS) signal having a pseudo-random noise sequence, a first frequency component and a second frequency component to the monitor unit; and wherein the micro-controller compares the first frequency component of the TDSSS signal to the monitor first frequency component of the MDSSS signal creating a first phase difference utilized for a coarse accuracy determination of the distance relative between the monitor unit and the tracked unit, further wherein the micro-controller compares the second frequency component of the TDSSS signal to the monitor second frequency component of the MDSSS signal to create a second phase difference utilized for a medium accuracy determination of range between the tracked unit on the object and the monitor unit.

2. The electronic system as recited in claim 1, wherein the monitor unit further includes a monitor phase detector, the MDSSS signal further includes a monitor third frequency component and the TDSSS signal further includes a third frequency component, wherein the monitor phase detector compares the third frequency component of the TDSSS signal with the monitor third frequency component to create a third phase difference; and the micro-controller determines the number of repeated frequency cycles of the third frequency component of the TDSSS signal to the monitor third frequency component of the MDSSS signal for fine accuracy determination of range between the tracked unit on the object and the monitor unit.

3. The electronic system as recited in claim 1, wherein the first frequency component of the TDSSS signal is a repetition rate of the TDSSS pseudo-random noise sequence and the monitor first frequency component is a repetition rate of the MDSSS pseudo-random noise sequence.

4. The electronic system as recited in claim 1, wherein the second frequency component of the TDSSS signal is a chipping frequency of the TDSSS pseudo-random sequence and the monitor second frequency component of the MDSSS is a chipping frequency of the MDSSS pseudo-random noise sequence.

5. The electronic system as recited in claim 2, wherein the third frequency component of the TDSSS signal is a carrier frequency and the monitor third frequency component of the MDSSS signal is a carrier frequency.

6. The electronic system as recited in claim 1, wherein the monitor unit further includes a first monitor antenna disposed on the monitor unit and a second monitor antenna disposed on the monitor unit, wherein the first monitor antenna is cross-polarized relative to the second monitor antenna for measuring the object distance and relative angle from the monitor unit.

7. The electronic system as recited in claim 1, wherein the second frequency component of the TDSSS signal is a pseudo-random noise sequence input into a first shift register and a second shift register, creating the first phase difference between the second frequency component of TDSSS signal and the monitor second frequency component of the MDSSS signal.

8. The electronic system as recited in claim 1, wherein the tracked unit further includes a tracked modulator and a tracked phase detector, wherein the tracked modulator shifts the TDSSS pseudo-random noise sequence and inputs the shifted TDSSS pseudo-random noise sequence into the tracked phase detector until the TDSSS pseudo-random noise sequence locks with the MDSSS pseudo-random noise sequence.

9. The electronic system as recited in claim 1, wherein the monitor unit includes a monitor compass having concentric rings wherein the monitor micro-controller is in electrical communication with the monitor compass, which displays location of the tracked unit within the concentric rings to provide a visual display for a user of the ranging distance between the monitor unit and the tracked unit, when in use.

10. The electronic system as recited in claim 1, wherein the monitor unit further comprises a monitor compass having user selectable zones represented by concentric zone rings, wherein the monitor compass displays the distance of the tracked unit relative to the monitor unit within the user selectable zones.

11. An electronic system for locating an object comprising:

a monitor unit having a micro-controller having a monitor phase detector, wherein the monitor unit transmits a monitor direct sequence spread spectrum (MDSSS) signal having a pseudo-random noise sequence, a monitor first frequency component and a monitor second frequency component;

a tracked unit placed on the object receiving the MDSSS signal from the monitor unit and transmits a tracked direct sequence spread spectrum (TDSSS) signal having a first frequency component, a second frequency component and a pseudo-random noise sequence, to the monitor unit;

wherein the micro-controller compares the first frequency component of the TDSSS signal to the monitor first frequency component of the MDSSS signal creating a first phase difference utilized for a coarse accuracy determination of the object distance ranging relative to the monitor unit;

further wherein, the micro-controller compares the second frequency component of the TDSSS signal with the monitor second frequency component of the MDSSS signal to create a second phase difference; and wherein the monitor phase detector monitors phase error output to determine number of repeated frequency periods of the second frequency component of the TDSSS signal for a medium accuracy determination of range relative to the monitor unit of the object range, wherein the first frequency component of the TDSSS signal is a repetition rate of the TDSSS pseudo-random noise sequence and wherein the second frequency component of the TDSSS signal is a chipping frequency of the TDSSS pseudo-random noise sequence.

12. The electronic system as recited in claim 11, wherein the tracked unit further includes a tracked phase detector, the TDSSS signal further includes a third frequency component and the MDSSS signal further includes a monitor third frequency component, wherein the tracked phase detector compares the third frequency component of the TDSSS signal with the monitor third frequency component of the MDSSS to create a third phase difference; and wherein the micro-controller determines the number of repeated frequency cycles of the third frequency component of the TDSSS signal for fine accuracy determination of distance between the monitor and tracked unit.

13. The electronic system as recited in claim 12, wherein the third frequency component of the TDSSS signal is a carrier frequency and the monitor third frequency component of the MDSSS signal is a carrier frequency.

14. The electronic system as recited in claim 11, wherein the monitor unit further comprises a first monitor antenna disposed on the monitor unit and a second monitor antenna disposed on the monitor unit, wherein the first monitor antenna is cross-polarized relative to the second monitor antenna for measuring the object range and relative angle from the monitor unit.

15. The electronic system as recited in claim 11, wherein the monitor unit further includes a first shift register and second shift register and the second frequency component of the TDSSS signal is input into the first shift register and the second shift register, creating the first phase difference between the second frequency component of the TDSSS signal and the second frequency component of the MDSS signal.

16. The electronic system as recited in claim 11, wherein the monitor unit further comprises a monitor compass having at least four coverage zones indicated by concentric rings, which displays object ranging distance between the tracked unit and the monitor unit, wherein a user selects one coverage zone from the concentric rings for tracking the tracked unit.

17. A method for detecting the range of an object comprising:

placing a tracked unit on the object, wherein the track unit includes a tracked direct spread spectrum (TDSSS) signal having a first frequency component and a second frequency component;

transmitting from a monitor unit a monitor direct sequence spread spectrum (MDSSS) signal having a monitor first frequency component and a monitor second frequency component, wherein the monitor unit includes a monitor phase detector;

receiving the MDSSS signal at the tracked unit;

transmitting from the tracked unit the TDSSS signal to the monitoring monitor unit;

comparing the first frequency component of the TDSSS signal to the monitor first frequency component of the MDSSS signal within the monitor-phase detector;

outputting a first phase shift for course accuracy determination of the object range relative to the monitor unit;

comparing the second frequency of the TDSSS signal to the monitor second frequency component of the MDSSS signal within the monitor phase detector, outputting a second phase-shift; and, determining the number of repeated frequency periods of the second frequency component of the TDSSS signal.

* * * * *